T. R. LANDON.
CULTIVATOR.
No. 185,551.  Patented Dec. 19, 1876.
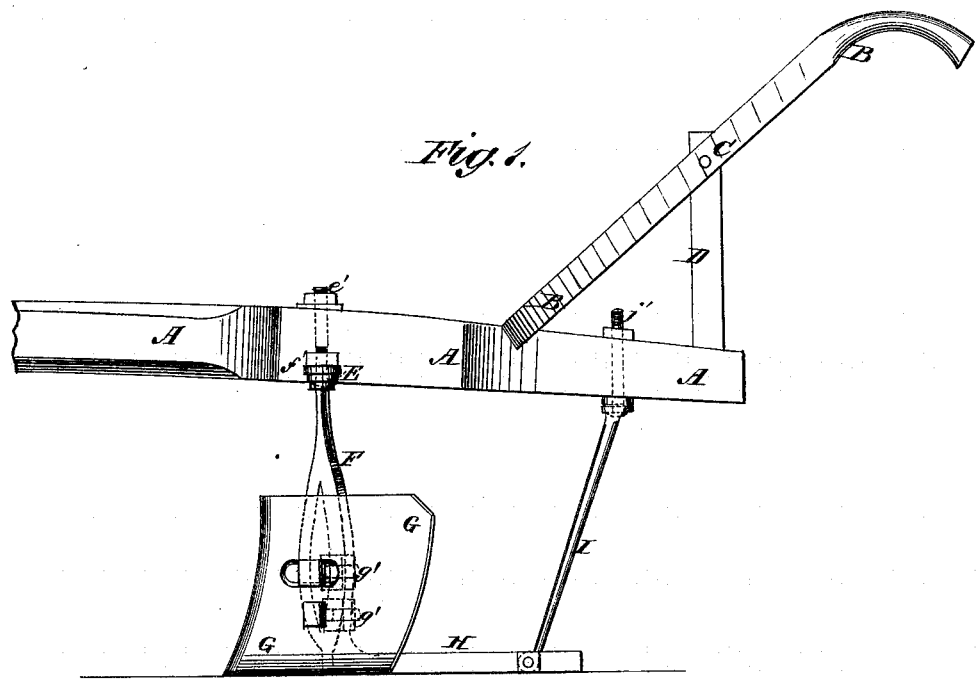
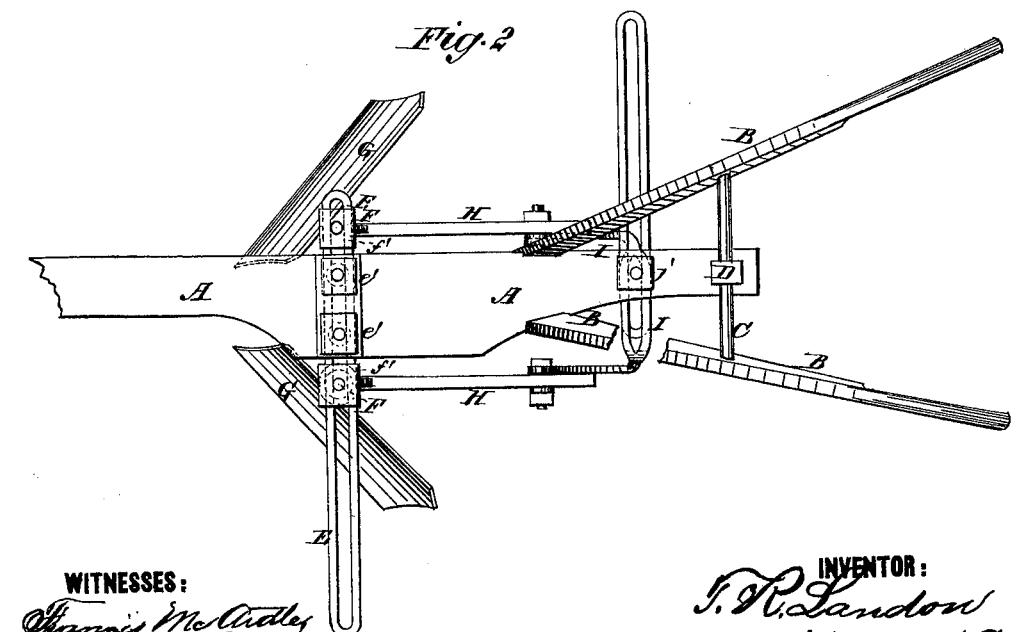

UNITED STATES PATENT OFFICE.

THOMAS R. LANDON, OF SLADESVILLE, NORTH CAROLINA.

IMPROVEMENT IN CULTIVATORS.

Specification forming part of Letters Patent No. 185,551, dated December 19, 1876; application filed August 21, 1876.

*To all whom it may concern:*

Be it known that I, THOMAS RODMAN LANDON, of Sladesville, in the county of Hyde and State of North Carolina, have invented a new and useful Improvement in Adjustable Cultivating-Plow, of which the following is a specification:

Figure 1 is a side view of my improved plow. Fig. 2 is a top view of the same.

Similar letters of reference indicate corresponding parts.

The object of this invention is to furnish an improved cultivating-plow for cotton, corn, and other plants, which shall be so constructed that it may be readily adjusted for use as a scraper, a sweep, and as a dirter, as may be required.

The invention will first be described in connection with the drawing, and then pointed out in the claim.

A is the beam, to the rear part of which are attached the forward ends of the handles B. The handles B are connected by a round, C, and are supported at the proper height by the standard D, through the upper end of which the round C passes, and the lower end of which is attached to the rear end of the beam A. E is a long cross-bar, which is slotted longitudinally, and is secured to the beam A by two bolts, $e'$, so that by loosening the said bolts $e'$ the bar E may be adjusted as desired. In the slot of the bar E are placed the upper ends of the forward standards F, which are secured in place by nuts $f'$, screwed upon the said upper ends. The standards F have slots formed in them to receive the bolts $g'$, by which the plow-plates G are secured to the said standards, so that, by loosening the said bolts $g'$, the plows G may be adjusted to work deeper or shallower in the ground. The rear ends of the standards F are bent to the rearward, to form feet H, or have feet H attached to them to strengthen them, and enable the plow to be more easily held, guided, and controlled. The rear ends of the feet H are bolted to the lower ends of the rear standards I. The upper parts J of the standards I are bent inward at right angles, are slotted longitudinally, and are secured to the beam A by a bolt, $j'$, so that by loosening the bolt $j'$ the rear standards I may be adjusted, as required, to correspond with the adjustment of the forward standards, and to cause the plows G to throw more or less dirt, as may be desired. To adjust the plow as a double dirter, the standards F and their attached plow-plates are exchanged.

Having thus described my invention, I claim as new and desire to secure by Letters Patent—

The angular standard-bars F H, slotted in their vertical arms, in combination with the braces I, having slotted horizontal upper arms, and with the slotted adjustable cross-bar E and beam A, substantially as herein shown and described.

THOMAS RODMAN LANDON.

Witnesses:
 ASA J. SMITH,
 R. D. HARRIS.